Feb. 28, 1950 R. BRUNKEN 2,499,128
TORQUE CONVERTER CONTROL
Filed July 27, 1944 14 Sheets-Sheet 1

Fig. 1.

INVENTOR.
RENKE BRUNKEN
BY
ATTORNEYS

Feb. 28, 1950

R. BRUNKEN

2,499,128

TORQUE CONVERTER CONTROL

Filed July 27, 1944

INVENTOR.
RENKE BRUNKEN

BY *Richey & Watts,*

ATTORNEYS

Patented Feb. 28, 1950

2,499,128

UNITED STATES PATENT OFFICE 2,499,128

TORQUE CONVERTER CONTROL

Renke Brunken, Shaker Heights, Ohio, assignor to The White Motor Company, Cleveland, Ohio, a corporation of Ohio Application July 27, 1944, Serial No. 546,891

13 Claims. (Cl. 74—472)

This invention relates broadly to torque converters for motor vehicles and more specifically to an improved gear shift control mechanism therefor. The invention further relates to improvements in the mechanism disclosed in my copending application, Serial No. 436,443, filed March 27, 1942, entitled "Automatic gear shifting mechanism," now Patent No. 2,373,452, dated April 10, 1945.

One of the objects of the invention is to provide a change speed gear control unit for a combined torque converter and geared transmission which is designed to eliminate the drag that customarily occurs in hydraulic driving units when the vehicle is at rest.

Another object of the invention is to provide a change speed gear control unit for a hydraulic transmission of the type that embodies a supplemental gear train and a torque converter of relatively small proportions.

Another object of the invention is to provide an automatic change speed gear unit for a transmission of the type that embodies a torque converter having a supplemental gear train associated therewith.

A further object of the invention is to provide a change speed gear control unit which is designed to increase the economy of operation of the vehicle.

Another object of the invention is to provide an organization of overrunning clutches in a combined hydraulic and geared transmission which is designed to facilitate the use of the braking effort of the engine to arrest the movement of the vehicle in the same manner as effected in geared transmissions of conventional form.

A further object of the invention is to provide mechanism to prevent the rotative speed of the engine from dropping below the speed of the turbine during the operation of the mechanism within which the transmission is incorporated.

Other objects of the invention reside in the provision of a transmission which will effectuate substantial savings in weight, economies in the operation of the vehicle with which it is associated and economies in the maintenance thereof.

Other objects and advantages more or less ancillary to the foregoing and the manner in which all the various objects are realized will appear in the following description, which considered in connection with the accompanying drawings, sets forth the preferred embodiment of the invention.

Referring to the drawings.

Figure 3:
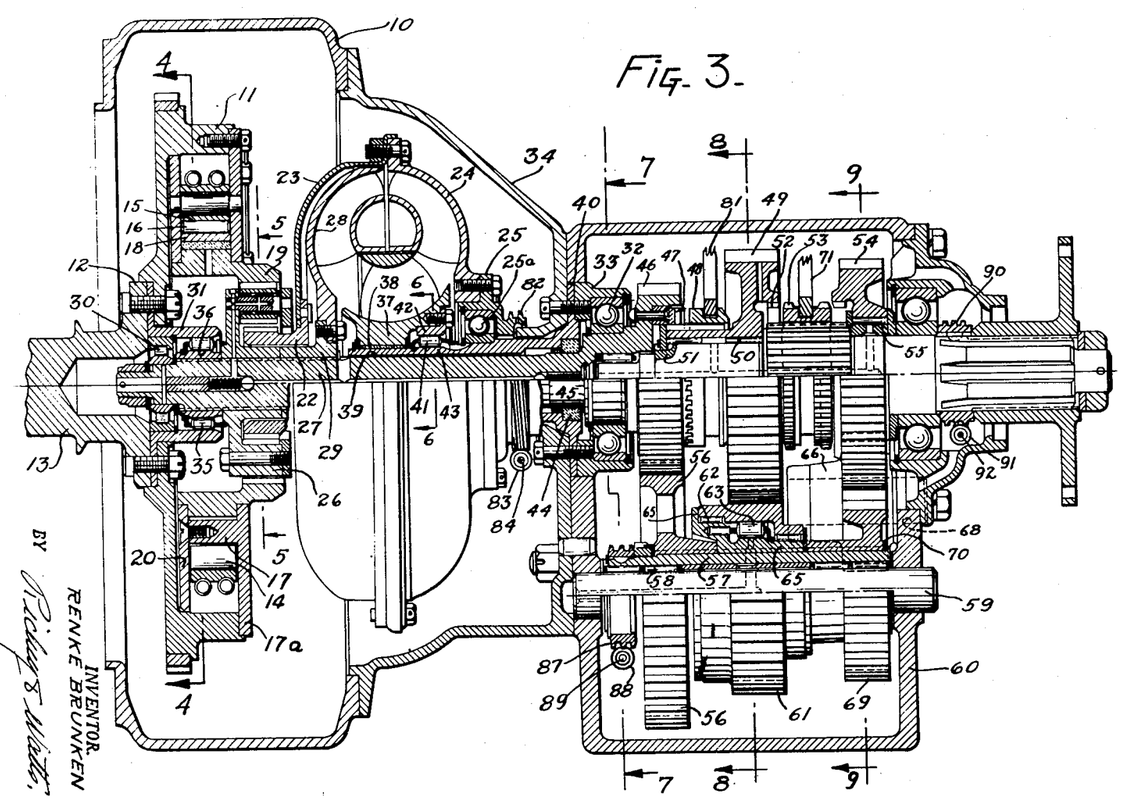
Fig. 3 is a longitudinal section taken on the line 3—3 of Fig. 2.
Figure 4:
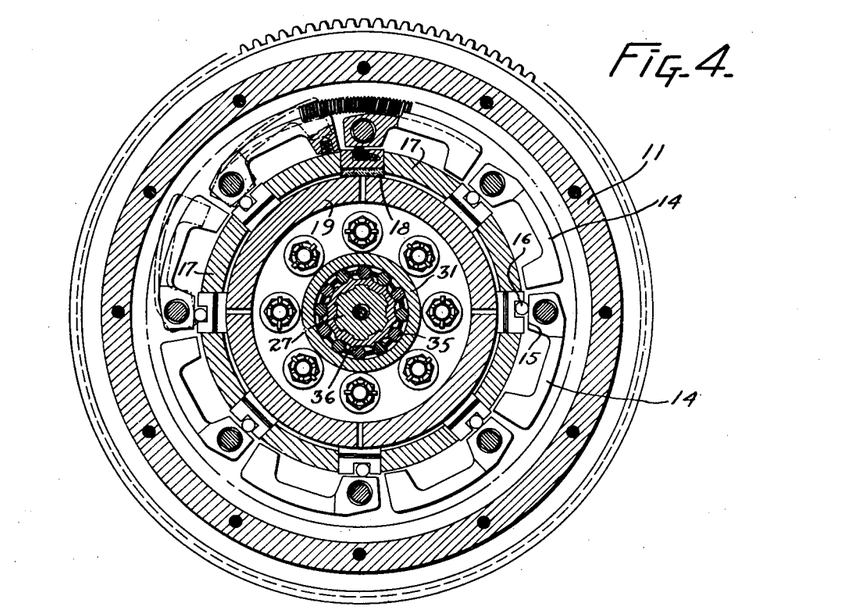
Fig. 4 is a transverse section through a clutch mechanism supported within the engine fly wheel housing, the section being taken on the line 4—4 of Fig. 3.
Figure 5:
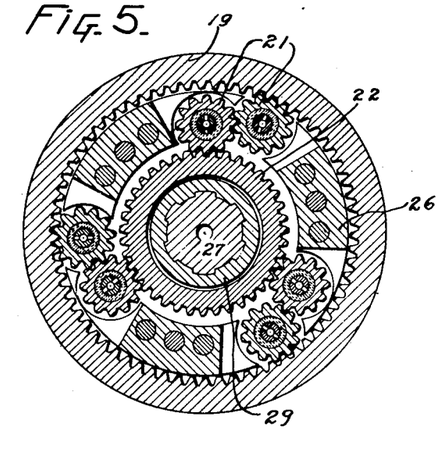
Fig. 5 is a transverse section through a differential gear mechanism, the section being taken on the line 5—5 of Fig. 3.
Figure 6:
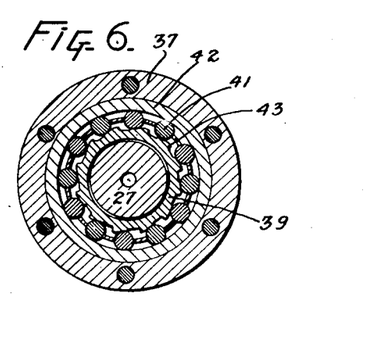
Fig. 6 is a transverse section through an overrunning clutch within the torque converter, the section being taken on line 6—6 of Fig. 3.

Referring first to Fig. 3, the housing 10 is formed for the reception of a fly wheel 11 bolted to a companion flange 12 formed in the end of the engine crankshaft 13. The fly wheel 11, as will be seen in Fig. 4, is constructed with a centrifugal clutch mechanism embodying a plurality of fingers 14 having cam engaging surfaces 15 thereon normally supported in spring pressed engagement with rollers 16 mounted in bearing blocks retained within a cage 17. The cage is formed with a flanged face plate 17a which is bolted upon the outer face of the fly wheel 11. The body of the cage 17 is provided with openings for the reception of the bearing blocks or shoes 18 which ride upon the periphery of a hub portion of an internal gear 19 (Fig. 3) supported against axial movement by the flanged portion of the cage 17 and a clutch plate 20. The internal gear 19 embodies the driving element of a planetary gear unit comprising a pair of intermeshed pinions 21 which are engaged respectively with the internal gear 19 and a spur gear 22 bolted to a pump driving member 23 (Fig. 3). The torque converter pump 24 is bolted to the driving member 23 and supported upon a bearing cage 25 for an anti-friction bearing 25a which in turn is supported by a reaction member sleeve 39 bolted to the torque converter housing 34.

In operation the engine power is transmitted through the automatic clutch to the planetary gear ring 19, the pinions 21—21, a portion of this power being delivered through the gear 22 and driving member 23 to the pump 24, the remaining power being delivered through the planetary gear cage 26 to the turbine shaft 27. The turbine 28 is formed with a hub 29 broached for engagement with the shaft 27 and disposed in abutting relation with the hub of the gear cage 26. The turbine shaft 27 is mounted on roller bearing 30 supported in a housing 31 bolted upon the flange 12 of the crankshaft 13. The opposed end of the shaft 27 is supported by anti-friction bearings 32 mounted in a retainer 33 bolted to the torque converter housing 34. The bearing cage 31 is further employed as the outer race for an overrunning clutch 35 (Figs. 3 and 4) the cam element 36 thereof being mounted on the splined shaft 27.

The reaction member 37 of the torque converter is mounted for rotative movement upon a wear bushing 38 on a sleeve 39 disposed in spaced relation with the shaft 27. The outer end of the sleeve 39 is formed with a flange 40 which is drilled for the reception of cap screws for the support of the bearing retainer 33.

A one-way brake 41 is associated with the reaction member 37, the outer race 42 thereof being bolted to the face of the reaction member while the inner race or cam 43 therefor is formed in the body of the sleeve 39. The flange 40 is counterbored for the reception of a bearing 44 for the support of a journal 45 machined in the shaft 27. The enlarged end portion of the shaft 27 is machined to form a gear 46 having an internal dog clutch 47 therein mounted for engagement with a companion member 48 supported for reciprocative movement upon the splined hub of a gear 49 supported on needle bearings 50 on the propeller shaft 51. The gear 49 is formed with internal teeth 52 in the web thereof adapted for engagement with a clutch 53 mounted upon a splined portion of the shaft 51. The clutch 53 is further engageable with the toothed portion of a third spur gear 54 mounted on needle bearings 55 on the shaft 51.

Figures 7, 12:
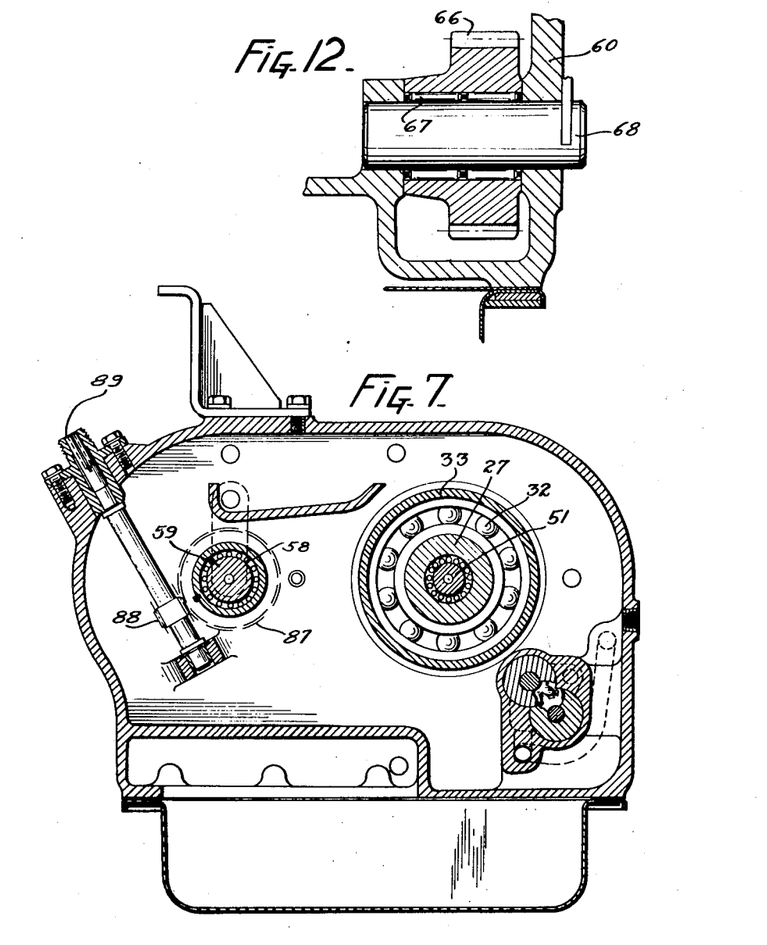
Fig. 7 is a transverse section through the gear casing, illustrating the arrangement of the control unit power take-off, the section being taken on the line 7—7 of Fig. 3.
Fig. 12 is a vertical section through a portion of the gear case illustrating the construction of the reverse idler gear supporting members, the section being taken on the line 12—12 of Fig. 9.
Figure 8:
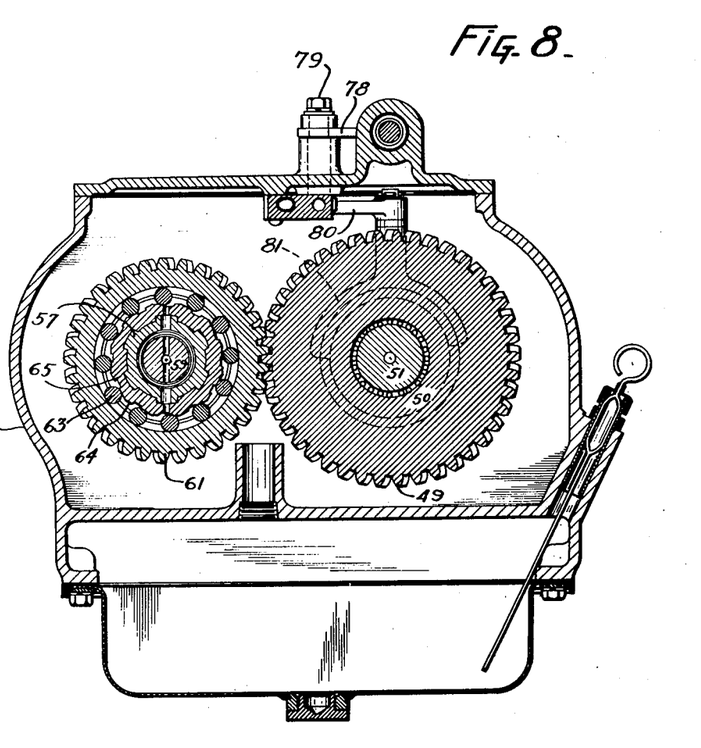
Fig. 8 is a transverse section through another portion of the gear casing and a clutch or free wheeling unit, the section being taken on the line 8—8 of Fig. 3.
Figure 9:
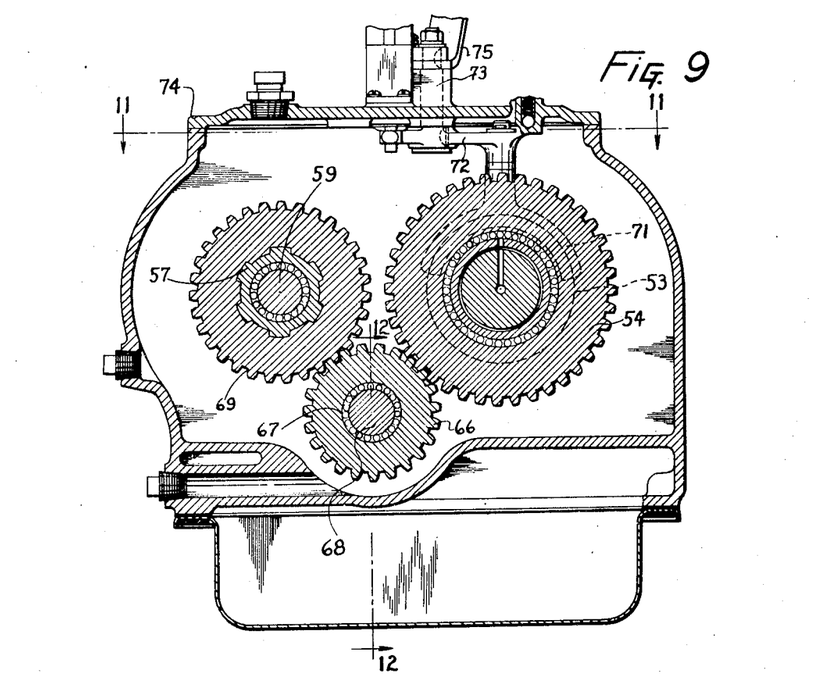
Fig. 9 is a transverse section through the gear casing illustrating the arrangement of the reverse gear, the section being taken on the line 9—9 of Fig. 3.

The gear 46 is meshed with a gear 56 broached for engagement with a splined sleeve 57 mounted on needle bearings 58 upon a bar 59 secured in the gear case 60. The gear 49 is meshed with a gear 61 bored for the reception of a needle bearing 62 and a free wheeling mechanism 63, the cam element 64 thereof (Fig. 8) being formed in the circumferential face of a hub member 65 which is engaged with the splined sleeve 57. The gear 54 is meshed with an idler gear 66 (Figs. 9 and 12) supported on anti-friction bearings 67 mounted on a bar 68 secured in the gear case 60. The idler gear in turn is meshed with a reverse gear 69 affixed to the sleeve 57 and restrained against axial movement by a snap ring 70.

The clutch 53 is formed with an annular groove for the reception of a yoke 71 (Fig. 9) mounted on an arm 72 keyed to a pin 73 mounted for pivotal movement in the gear case cover plate 74. A manually operable gear shift lever 75 (Fig. 1), is also keyed to the portion of the pin 73 which protrudes beyond the outer face of the cover plate 74. Actuation of the lever to the limit of its counterclockwise movement or the position F will effect the engagement of the clutch 53 with the gear 49 and thus couple the propeller shaft with the engine through the centrifugal clutch in the fly wheel 11, the planetary gear unit, the torque converter and gear carrier 26, the shaft 27 and gear 46, the gear 56, the sleeve 57, the free wheeling unit and the gears 61 and 49. Actuation of the lever 75 to the limit of its clockwise movement or the position R will effect the engagement of the clutch 53 with the gear 54 and thus couple the propeller shaft for reverse drive through the idler 66, the gear 69, the sleeve 57 and the source of power as in the former case. Adjustment of the lever 75 to the medial or neutral position N as shown in Fig. 1 will bring the clutch 53 intermediate the forward and reverse gears 49 and 54, as shown in Fig. 3, and thus facilitate operation of the engine while the vehicle is at rest.

Figure 13:
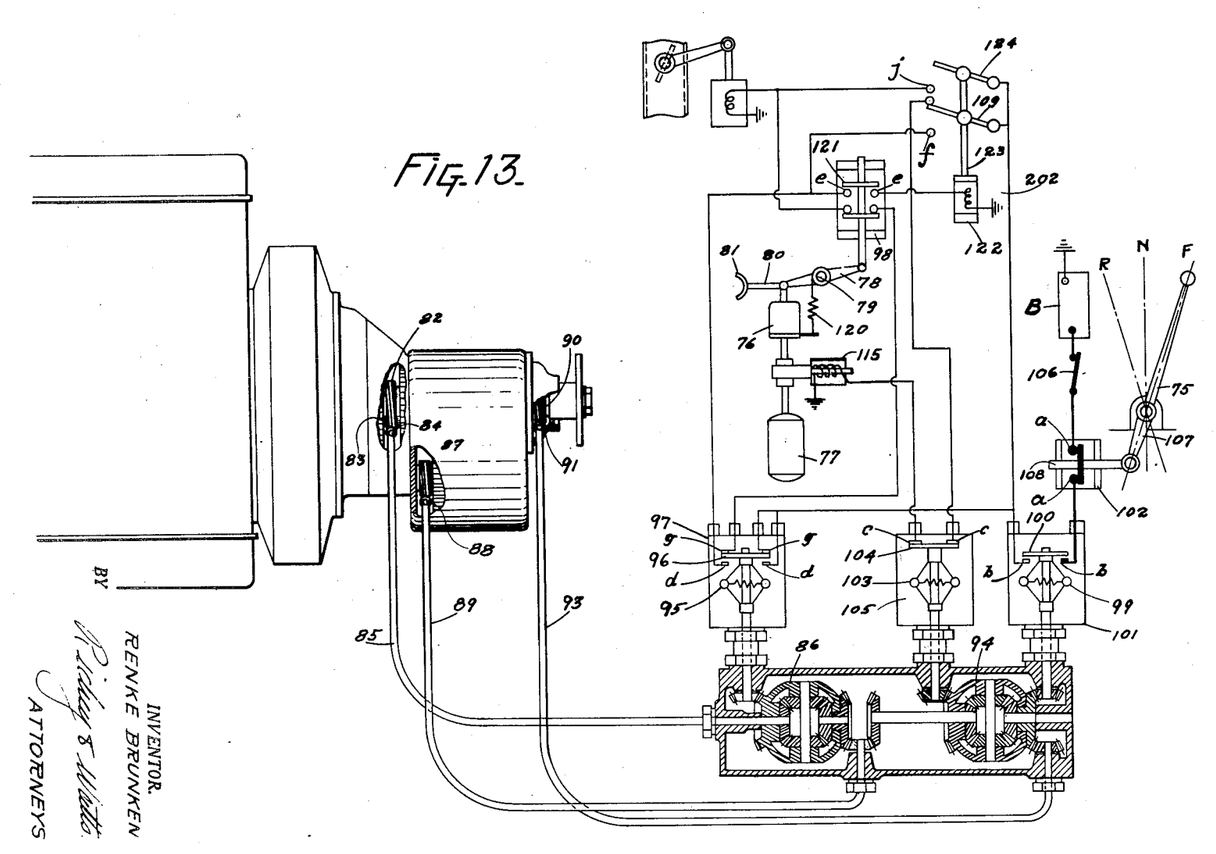
Fig. 13 is a diagrammatic view of a fragmentary portion of an engine, transmission, the control mechanism for the change speed gearing associated with the transmission and the electrical connections therefor.

The clutch 48, which is provided to effect high and low speed drive, is actuated by a piston mounted in a cylinder 76 connected with source of fluid under pressure, such for example as the compressed air reservoir 77 illustrated diagrammatically in Fig. 13. The piston in the cylinder 76 is connected with a lever 78 keyed to a pin 79 having an arm 80 affixed thereto upon which there is mounted a yoke 81 (Fig. 8) engaged in a groove in the clutch member 48.

Figure 1:
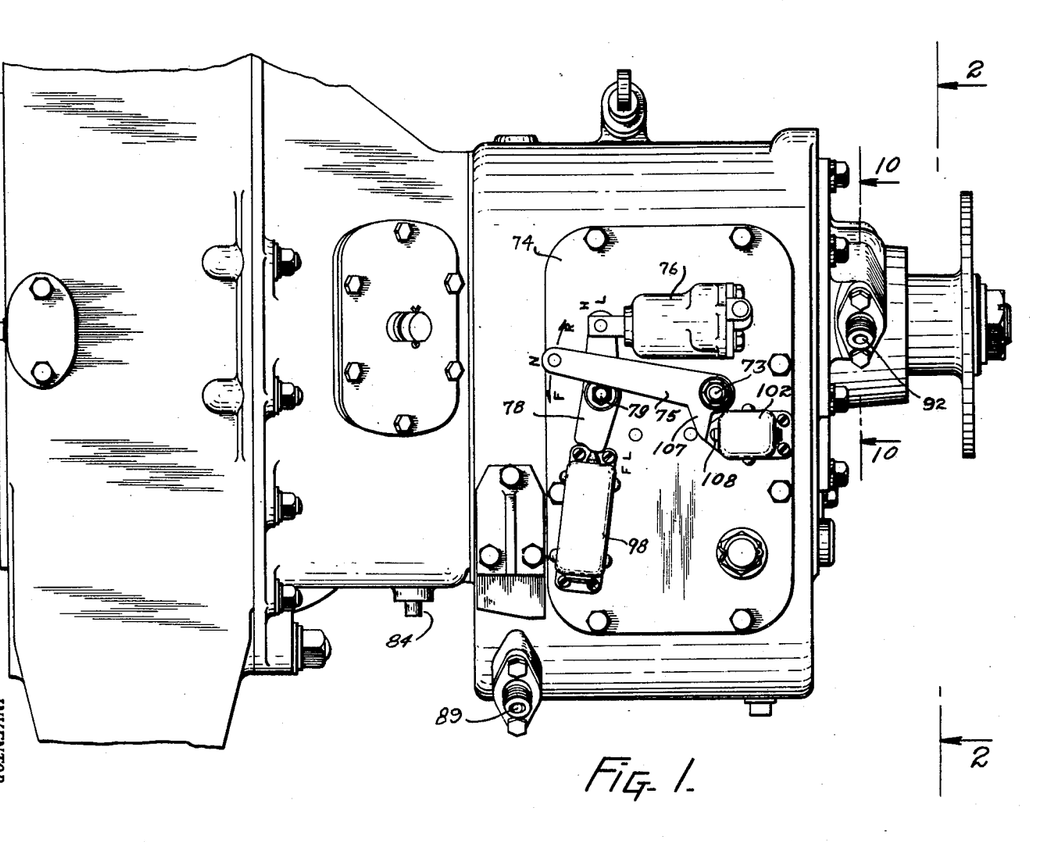
Fig. 1 is a plan view of a fragmentary portion of an engine, a torque converter, a geared transmission unit and the improved control mechanisms therefor.
Figure 2:
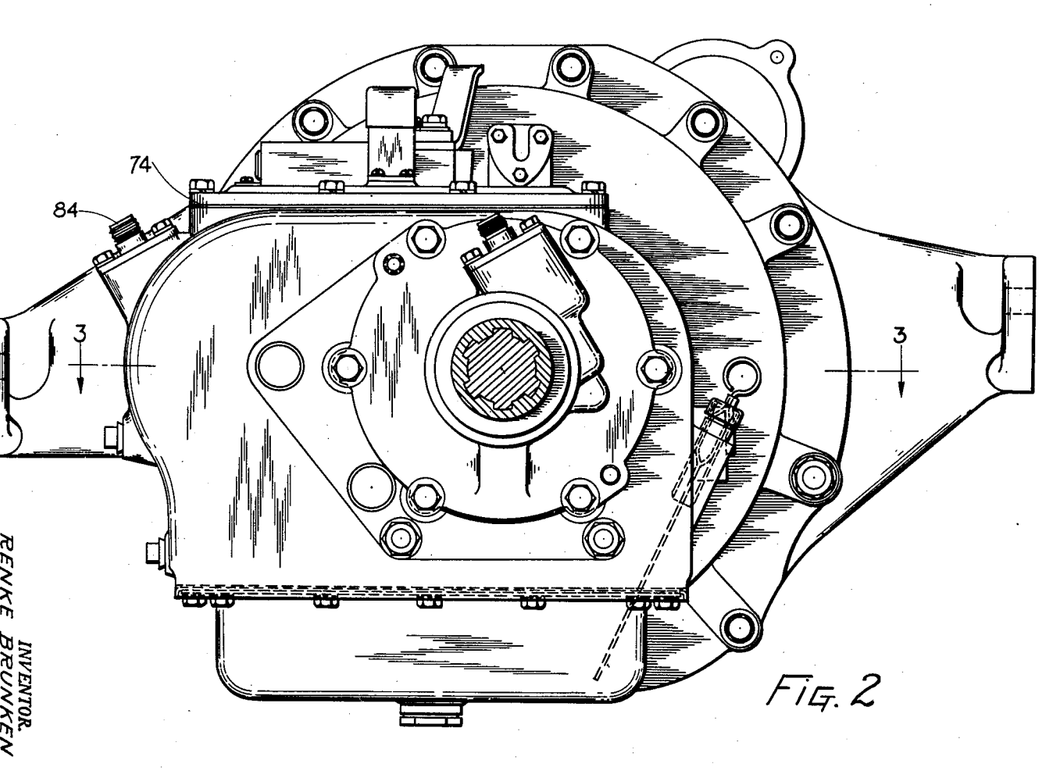
Fig. 2 is a section taken on the line 2—2 of Fig 1.

When the piston is retracted as shown in Fig. 1, the clutch 48 is disengaged with the gear 46 and power is transmitted through the gear train in the manner described above. When, however, the clutch is engaged with the gear 46 power is transmitted through the splined hub of the gear 49 and through the clutch 53 to the propeller shaft 51, the gear 61 at this time overrunning the cam 65 through free wheel unit 63.

Speed changes from low to high and from high to low are effected by the automatic operation of the fluid actuating mechanism for the clutch 48, the control mechanism therefor being regulated by the speed difference between the engine and turbine and/or the turbine and propeller shaft.

Figure 10:
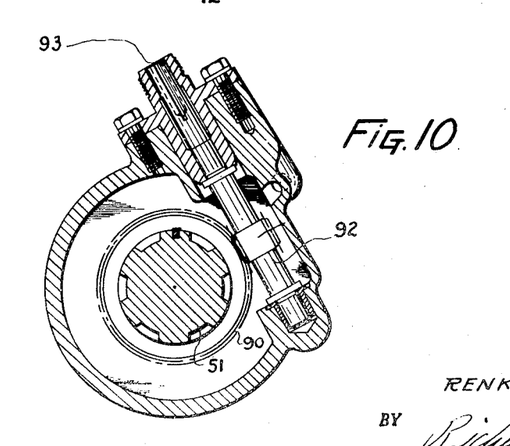
Fig. 10 is a transverse section through the gear case illustrating the arrangement of the control unit power take-off, the section being taken on the line 10—10 of Fig. 1.
Figure 11:
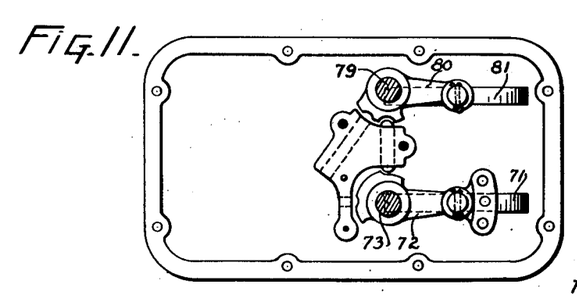
Fig. 11 is a horizontal section through a portion of the gear case illustrating the structure of the gear shift linkage, the section being taken on the line 11—11 of Fig. 9.

The mechanism for effectuating the automatic gear shift operation embodies, generally, an organization of differential gear units driven by the engine, turbine and propeller shaft and coupled in turn with electric responsive devices for controlling the operation of the valve to the fluid actuating mechanism. In detail the bearing cage 25 for the pump 24 is formed with a spiral gear 82 engaged with a driven spiral gear 83 (Fig. 3) mounted on a shaft 84 coupled with a flexible drive shaft 85 which is connected in turn to one side of a differential gear unit 86 illustrated somewhat diagrammatically in Fig. 13. The inner end of the sleeve 57 in the countershaft gear assembly is provided with a spiral gear 87 meshed with a spiral gear 88 (Figs. 3 and 13) coupled with a flexible shaft 89 connected through bevel gearing with the opposite side of the differential gear unit 86 and through bevel gearing with one side of a differential gear unit 94. The propeller shaft 51 is provided with a spiral gear 90 (Figs. 3, 10 and 13) meshed with a driven gear 91 mounted on a shaft 92 having a flexible shaft 93 coupled therewith which is connected with the opposite side of the second differential gear unit 94. The case or driven element of the differential gear unit 86 is intergeared with a governor 95 having a switch plate 96 mounted thereon adapted for engagement with contacts in a switch unit 97 electrically connected with a second switch unit 98 controlled by the fluid actuated piston in the cylinder 76. The flexible shaft 93 is coupled through bevel gearing with a governor 99 having a switch plate 100 mounted thereon adapted for engagement with contacts in a switch 101 electrically connected with a switch 102 controlled by the gear shift lever 75. The differential gear unit 94 is intergeared with a governor 103 having a switch plate 104 mounted thereon engageable with contacts in a switch 105.

In operation, the vehicle may be put into motion by closing the ignition switch 106, starting the engine, adjusting the gear shift lever 75 to the forward drive position (F) thus engaging the clutch 53 with the gear 49, then accelerating the engine to effect the operation of the centrifugal clutch in the fly wheel and consequent transmission of power through the planetary gearing, torque converter and gear train coupled with the propeller shaft. As will be seen in Figs. 1 and 13, adjustment of the lever 75 will bring the arm 107 on the inner end thereof into abutting engagement with the spring pressed stem 108 of the switch 102, thus connecting the contacts a—a in the switch 102 and causing the current from the battery B to flow to one of the contacts b in the switch unit 101. As the vehicle speed is increased the weights in the governor 99 will effect the retraction of the switch plate 100 into engagement with the contacts b—b (Fig. 14), permit the current to flow through the line 202, the switch 109 and the line 203 to the contact c in the switch unit 105. During the initial movement of the vehicle the speed of the engine is greater than that of the turbine, the speed difference between the two units being sufficient to effect the rotation of the governor 95 and consequent retraction of the switch plate 96. Hence as the contacts d—d in the switch unit 97 are bridged the current will flow through the lines 205, 209, and 210 to the contact e in the switch unit 98 and the contact f for the switch 109.

Figures 14, 15:
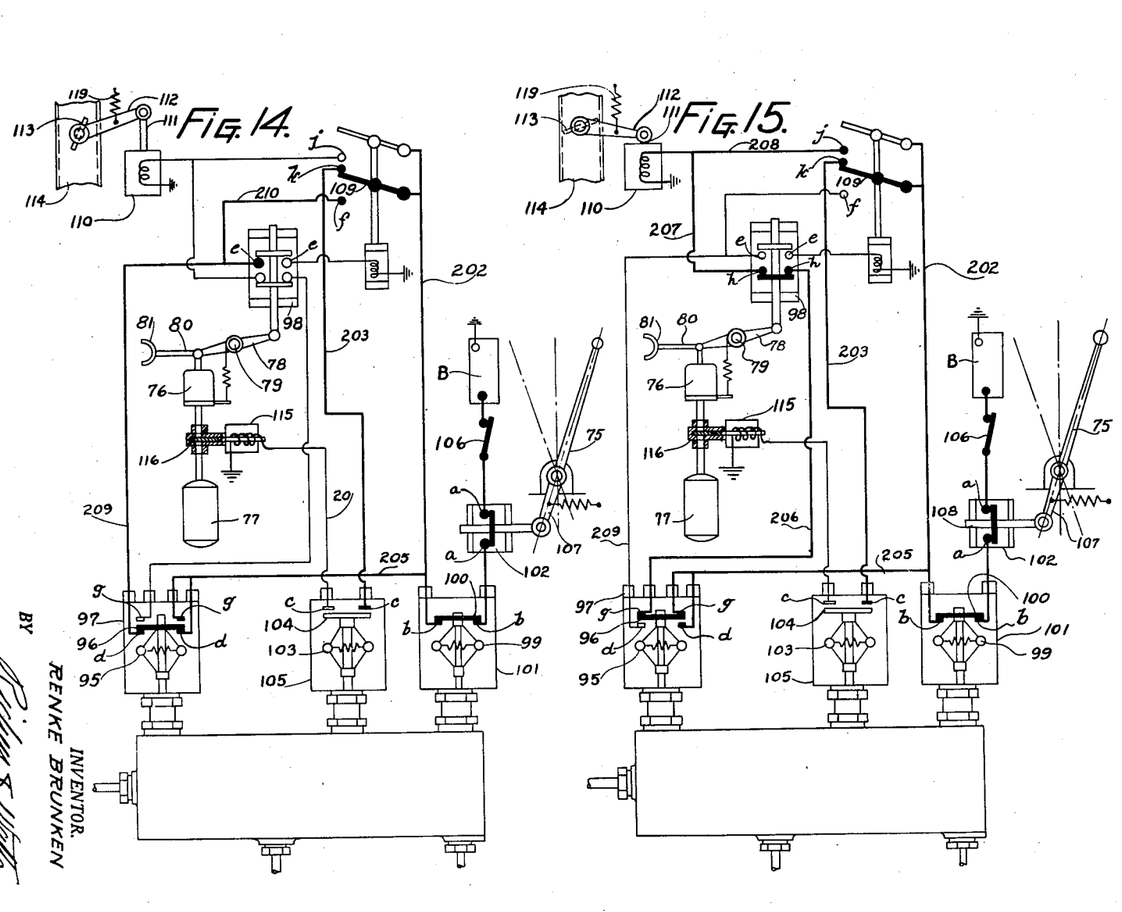
Figs. 14, 15, 16, 17, 18 and 19 are wiring diagrams including somewhat diagrammatically the control elements for effecting the automatic actuation of the gear shift control mechanisms, the heavy lines in the wiring diagram indicating the flow of the current established through actuation of the various instrumentalities embodied in the control mechanism.

As the vehicle accelerates the speed of the turbine will increase to a point almost equal to that of the engine. When the differential speed between the engine and turbine reaches a predetermined minimum the spring in the governor 95 will outweigh the centrifugal effort of the governor fly weights and move the switch plate 96 into engagement with the contacts g—g in the switch unit 97 as shown in Fig. 15. It should be noted that the foregoing operation does not depend upon the speed of the vehicle but rather upon the speed of the turbine as biased by that of the engine. Thus while the vehicle is in low gear and the engine at full throttle the turbine will not reach the engine speed until the vehicle has attained a relatively high speed. On the other hand, if the engine is at part throttle the speed of the turbine may reach that of the engine at a relatively low vehicular speed. Hence it will be seen that actuation of the plate 96 into engagement with the contacts g—g may occur whenever the speed difference between the engine and turbine reach a predetermined minimum. Operation of the switch unit 97 is ineffectual when the switch 101 is open since the circuit through the line 205 is broken at this time. When the switch 101 and the contacts g—g in the switch 97 are closed the circuit will flow through the lines 205—206, the contacts h—h in the switch 98 and through the lines 207 and 208 to the solenoid 110. Energization of the solenoid 110 will cause the retraction of the plunger 111 therein, the acceleration of the arm 112 and the consequent adjustment of the butterfly valve 113 to its closed position within the carburetor intake pipe 114, thus reducing the flow of fuel to the engine and effectuating the deceleration thereof. When the switches are positioned in the manner described above current will also flow through the line 202, the switch 109 and the line 203 to the contact c in the switch 105.

Figures 16, 17:
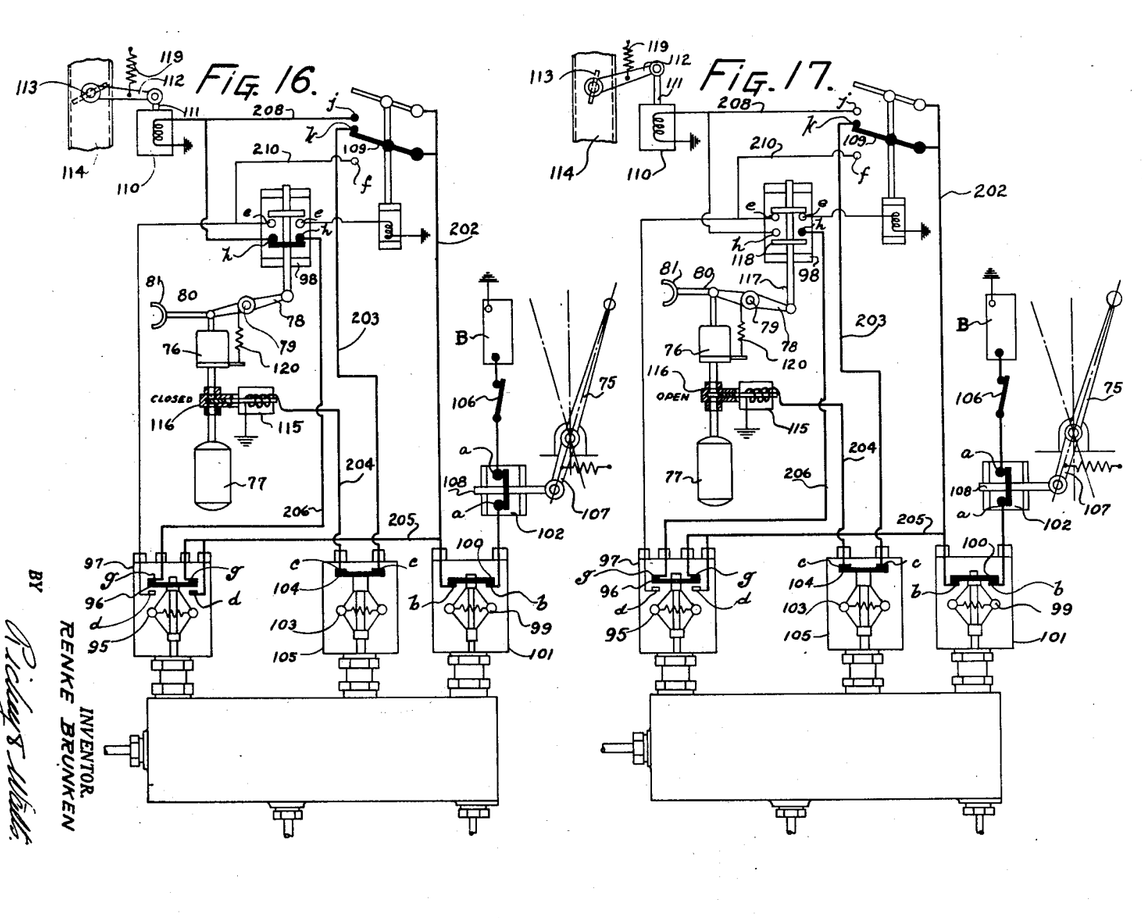

As the engine speed falls consequent the adjustment of the valve 114 to its closed position, the turbine speed will likewise drop until it is almost equal to that of the propeller shaft. When the differential speed between the turbine and propeller shaft reach a predetermined minimum, i. e. a point where the effort of the spring in the governor 103 will overcome the centrifugal force of the fly weights therein, the plate 104 will be moved into engagement with the contacts c—c (Fig. 16) and the current flowing through the switch 101 will then follow the line 202, the switch 109, the line 203, the switch 105 and the line 204 to the solenoid 115 whereupon the core therein carrying the valve 116 will be moved to its open position. As the compressed fluid in the reservoir 77 actuates the piston in the cylinder 76, the arm 80 and in turn the yoke 81 will be shifted to position the clutch 48 into operative engagement with the gear 46 (Figs. 3 and 17). From the foregoing it will be seen that the driving (gear 46) and driven (clutch 48) members are interconnected while the parts are synchronized and that such interconnection or so called "shift into high" will be effected irrespective the vehicular speed and without injury to either or tooth clash.

As will be seen in Fig. 17, when the piston in the cylinder is distended the lever 78 connected thereto will actuate the plunger 117 in the switch unit 98, thus retracting the plate 118 from the contact h—h, interrupting the circuit to the solenoid 110 and effectuating the restoration of the butterfly valve 113 through a retractible spring 119, to its open position. Should the operator decide to come to a stop while the parts are coupled in direct drive, deceleration of the vehicle by application of the brakes will retard the movement of the governor 99, and effect the actuation of the plate 100, thus breaking the circuit beyond the switch 101 which in turn will deenergize the solenoid 115, close the valve 116 and under the influence of the spring 120 cause the retraction of the piston and consequent disengagement of the clutch 48. Under such conditions the circuit and various elements of the control set will be organized for the initial starting operation as shown in Fig. 13.

Figures 18, 19:
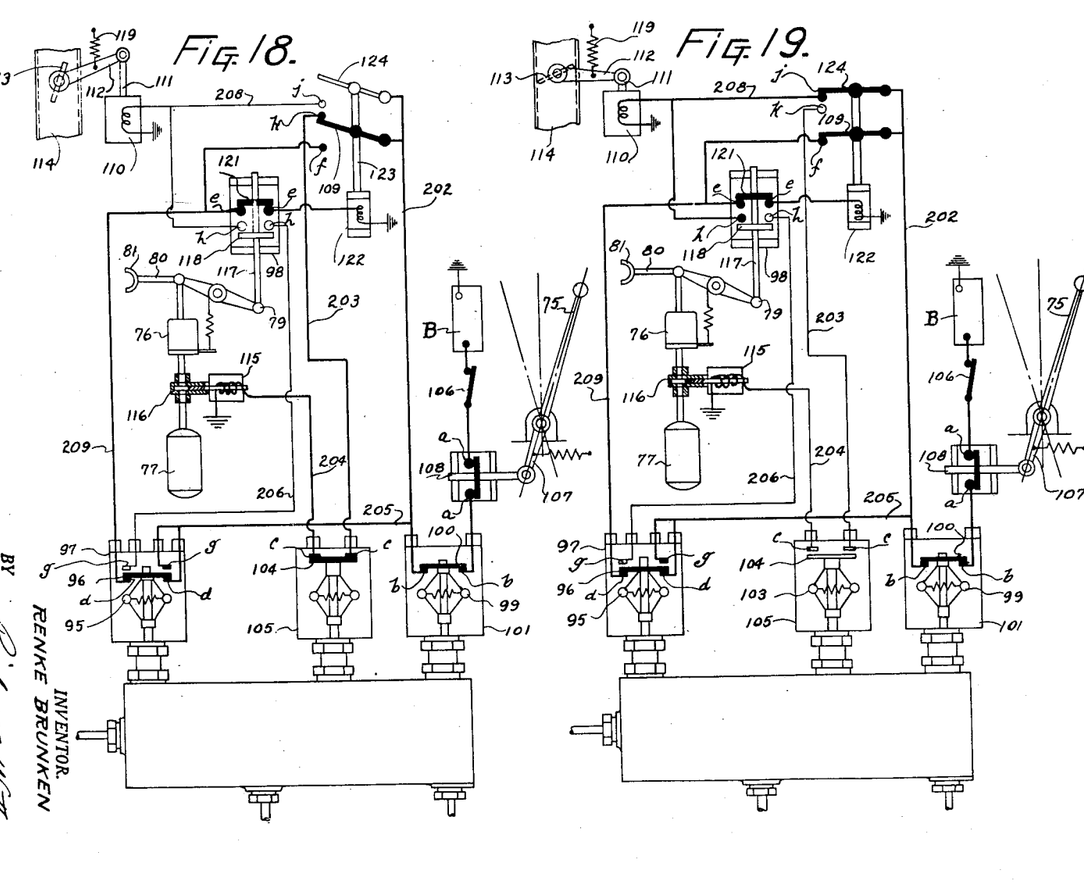

If while driving in direct drive a high resistance is encountered, such for example, a steep hill, the torque demand will increase and thus tend to retard the movement of the turbine. This will increase the speed difference between the engine and turbine, effect the rotation of the governor 95 until it reaches sufficient speed (a predetermined maximum) to move the plate 96 (Fig. 18) into engagement with the contacts d—d and establish the circuit from the battery B through the switch 101, the lines 205 and 209, the contacts e—e and plate 121 to the relay 122. Energization of the relay 122 will cause the retraction of the plunger 123 therein (Fig. 19) and the engagement of the pivotally mounted switch blades 109 and 124 with the contacts f and j, respectively, thus permitting the current to flow through the line 208 and excite the solenoid 110. As the plunger 111 in the solenoid is retracted the butterfly valve 113 will be oscillated to its closed position, the fuel supply and the speed of the engine accordingly decreased. Movement of the switch blade 109 will break the circuit through the contact k, line 203, switch 104 and line 204 to the solenoid 115, thus effectuating the retraction of the valve 116, the actuation of the yoke arm 89 and the disengagement of the clutch 48 with the gear 47. It will be noted that during this operation the engine speed has been reduced and the load upon the clutch teeth sufficiently decreased to facilitate the gear shift operation.

As will be seen in Fig. 13, when the piston in the cylinder 76 is retracted under the influence of the spring 120 the plunger 117 in the switch 98 will move the plate 121 from its engagement with the contacts e—e thereby breaking the circuit to the relay 122 and effecting the readjustment of the switch blades 109 and 124.

It will be understood that where reference has been made in the foregoing description to the speed difference or speed differential between the engine and turbine, converter pump and turbine and/or propeller shaft and turbine that such language is not intended to be confining but is to be construed to mean any resolved speed developed by the conjoint operation of such elements or operative medii which is a function of the speed of the turbine and engine or turbine and propeller shaft.

Figure 20:
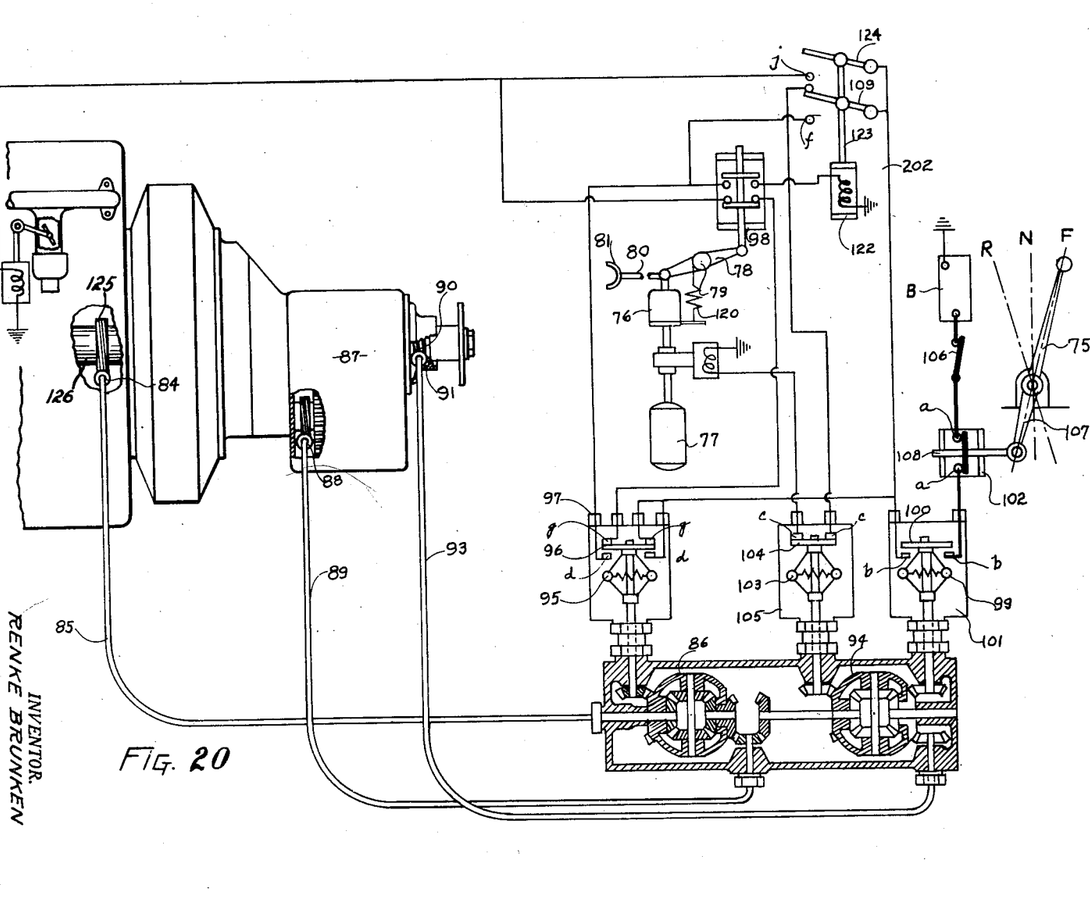
Fig. 20 is a diagram similar to Fig. 13, showing an alternate mounting for one of the differential gear unit cables.

In the modified form illustrated in Fig. 20 the flexible cable 85 is driven from a gear 125 mounted on the engine crankshaft 126, the arrangement of the cables 80 and 93 being the same, however, as those shown in Fig. 13. When the cable 85 is driven from the engine, as described above, the spring in the governor 95 may be modified to compensate for the difference in the rotative rate between the engine and torque converter pump or the ratio between the gear 125 and the driving elements entrained therewith may be increased.

Figure 21:
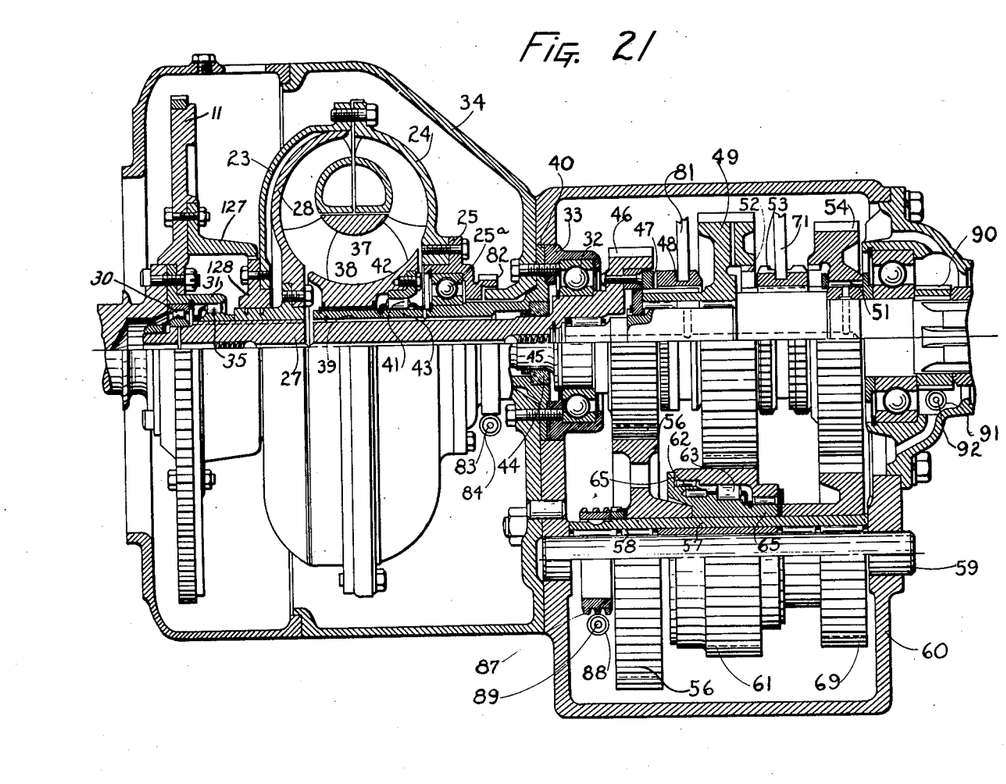
Fig. 21 is a longitudinal section, similar to Fig. 3, through a torque converter and the transmission gearing associated therewith showing an alternate driving connection for the turbine.

As shown in the embodiment illustrated in Fig. 21 the fly wheel 11 is counterbored for the reception of a flanged driving sleeve 127 which is coupled with a plate 128 bolted to the pump driving member 23. The fly wheel is further provided with a bearing cage 31, and anti-friction bearing 30 and an overrunning clutch 35 similar in all respects to the structure illustrated in Fig. 3.

As will be seen in the wiring diagrams (Figs. 13 to 20) the gear shift operation is dependent primarily upon the pre-selection of the circuits through the contacts d—d and g—g in the switch 97 which is controlled by the differential 86 operated by the engine and turbine. Under power application from the engine the differential will effect a uni-directional rotation of the governor 95 and actuate the plate 96 in the direction and operative order described above. When, however, the vehicle speed exceeds the driving rate of the engine, as occurs when the vehicle is descending a hill, the turbine speed will exceed the engine speed and, if it were not for the free wheeling unit 35, the turbine would then drive the differential in the opposite direction and disrupt the sequential order of movement of the switch plate 96. The function of the free wheeling unit 35 therefore is to prevent the countermovement of the differential 86 when the speed of the vehicle exceeds the driving rate of the engine and to this end the unit constitutes a stabilizing medium for the entire electric system.

Figure 22:
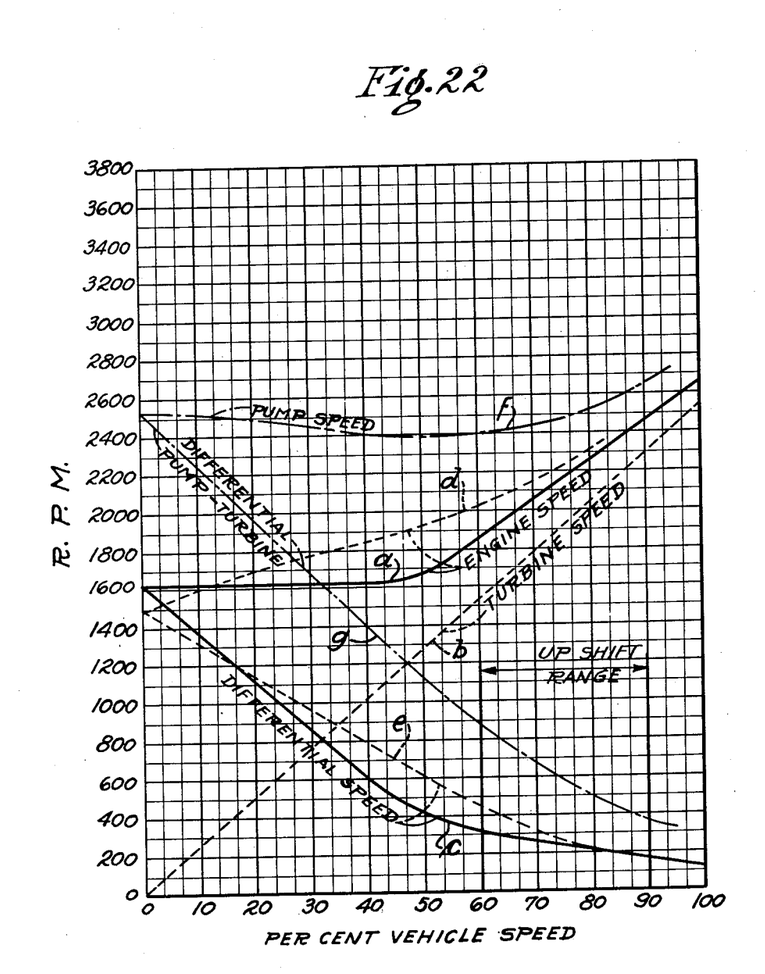
Fig. 22 is a chart showing the differential speed variations as obtained with the different types of torque converters contemplated herein.

Referring now to Fig. 22, the chart shows the relation of the speeds of the various elements of the vehicle driving mechanism plotted against vehicle speeds. The curve A indicates the engine speed characteristic as obtained in connection with a torque converter of the type shown in Fig. 21, the curve D indicates the engine speed characteristics so obtained with a torque converter drive of the type shown in Fig. 3. The curve F indicates the speed characteristics of the pump as obtained with a torque converter drive of the type shown in Fig. 3. The curve B indicates the turbine speed characteristics. The curve C indicates the speed differences between the curves A and B. The curve E indicates the speed difference between the curves D—B, and the curve G indicates the speed difference between the curves F and B.

It will be readily recognized that the smaller the range of speed demonstrated in a governor the greater the manufacturing difficulties thereof. Hence it is desirable to obtain as great a variation of the differential speeds as possible within the operating zone of the governor. By comparison of the curves CE and G it will be seen that the curves G and E are steeper than the curve C in the zone within the shift to higher speeds occur, i. e., the range included between 60 and 90 percent of the vehicle speed which is further indicated in the graph as the "up shift range."

The foregoing comparisons are based on full throttle operation, however, equivalent condition will obtain under any other throttle setting.

Although the foregoing description is necessarily of a detailed character, in order that the invention may be completely set forth, it is to be understood that the specific terminology is not intended to be restrictive or confining, and that various rearrangements of parts and modifications of detail may be resorted to without departing from the scope or spirit of the invention as herein claimed.

I claim:

1. In a motor vehicle embodying an engine, a pump driven thereby, a turbine driven by said pump, a gear train associated with said turbine, and a propeller shaft associated with said gear train, mechanism for the automatic connection of said propeller shaft with said turbine under low torque loads and with said gear train under high torque loads comprising a pair of differential gear units coupled respective with said engine and turbine and said propeller shaft and turbine, a governor driven by each of said differential gear units, a governor driven by said propeller shaft, electric switches controlled by each of said governors, a clutch intermediate said propeller shaft and said gear train, fluid actuated mechanism for shifting said clutch into and out of engagement with said gear train, means regulated by the turbine-propeller shaft governor switch for controlling the operation of said fluid actuated mechanism, means regulated by the turbine engine governor switch for throttling said engine, and means regulated by said propeller shaft governor switch for controlling the operation of the clutch shifting switch and the throttle operating switch.

2. In a motor vehicle embodying an engine, a pump, a turbine, a gear train and a propeller shaft, mechanism for coupling said propeller shaft with said turbine or said gear train comprising, a governor driven at the speed difference between the propeller shaft and turbine, a governor driven at a speed which is a function of the engine and turbine speeds, a governor driven by the propeller shaft, electric switches controlled by said governors, a clutch intermediate said propeller shaft and said turbine, means controlled by the first named governor switch for shifting said clutch, means controlled by the second named governor switch for throttling said engine and means controlled by the third named governor switch for regulating the operation of the first and second named governor switches.

3. In a motor vehicle embodying an engine, a pump, a turbine, a gear train and a propeller shaft, mechanism for coupling said propeller shaft with said turbine or said gear train comprising, a governor driven at the speed diffeence between the propeller shaft and turbine, a governor driven at the speed difference between the engine and turbine, a governor driven by the propeller shaft, electric switches controlled by said governors, a clutch engageable with said turbine and said propeller shaft, fluid operated mechanism for actuating said clutch, an electric switch actuated thereby, a solenoid controlled by said clutch switch, a second switch actuated thereby, an engine throttle valve, a solenoid for the actuation thereof controlled by the clutch switch, the solenoid switch and the engine turbine governor switch, a solenoid for controlling the operation of the clutch actuating mechanism, said solenoid being controlled by the turbine-propeller shaft governor switch, said propeller shaft-turbine governor switch and said solenoid switch and a switch regulated by said propeller shaft switch for the control of all of the aforesaid switches.

4. In a motor vehicle embodying an engine, a pump, a turbine, a gear train driven thereby and a propeller shaft, mechanism for driving the propeller shaft from said turbine or from said gear train, comprising a clutch associated with said turbine and said gear train, fluid operated mechanism for shifting said clutch, a governor operated at the speed difference between the turbine and propeller shaft, an electric switch regulated thereby and adapted to control said fluid operated mechanism, an engine throttle actuating mechanism, a governor operated as a function of the speed of the engine and turbine, an electric switch regulated thereby and adapted to control said throttle actuating mechanism, a speed responsive mechanism driven by said propeller shaft, and an electric switch regulated thereby and adapted to control the operation of the engine throttle governor operated switch.

5. In a motor vehicle embodying an engine with an output shaft, a power transmission mechanism therefor comprising a centrifugal clutch driven by the engine output shaft, a planetary gear unit operated by the clutch, a torque converter coupled with the gear unit, the torque converter including a pump and a turbine, a turbine shaft driven by the turbine, an overrunning clutch intermediate the turbine shaft and the engine output shaft, a gear train coupled with said torque converter, a unidirectional clutch therein, a propeller shaft, a clutch mounted for sliding movement relative to the turbine, a fluid operated mechanism for shifting said clutch, means controlled by the speed difference between the turbine and propeller shaft for shifting said clutch into engagement with said gear train, means controlled by the speed difference between the turbine and engine for throttling the engine and means governed by the speed of the propeller shaft for controlling the operation of said throttling means and said clutch shifting means.

6. An automatic change speed control unit for a motor vehicle embodying an engine, a hydraulic transmission including a pump and a turbine, a gear train and a propeller shaft and a clutch, a power operated actuating mechanism for said clutch, a governor operated by the speed difference between the turbine and the propeller shaft, an electric switch actuated by said governor, means associated therewith to effect the operation of the switch at a predetermined rate of speed, means controlled by said switch for operating said clutch actuating mechanism, a governor operated by the speed difference between the engine and the turbine in the hydraulic transmission, an electric switch actuated by said governor, means associated therewith to effect the operation of the switch at a predetermined rate of speed, means controlled by said switch for throttling said engine, and means controlled by the speed of the propeller shaft for effecting the simultaneous operation of the aforesaid switches.

7. A power transmission mechanism for a motor vehicle including an engine, a crankshaft and a propeller shaft, said transmission comprising a torque converter, a pump and a turbine therein, said pump being coupled with said crankshaft, a turbine shaft coaxially aligned with the crankshaft, a one way clutch intermediate said turbine shaft and said crankshaft, a gear train driven by said turbine shaft, a clutch intermediate said turbine shaft and said propeller shaft, an electrically controlled automatic clutch shifting mechanism associated with said clutch, and means for operating said clutch shifting mechanism at a predetermined value of a function of the speeds of the turbine and the propeller shaft.

8. In a motor vehicle embodying an engine, a pump, a turbine, a gear train and a propeller shaft, mechanism for coupling said propeller shaft with said turbine or said gear train comprising, a governor driven at the speed difference between the pump and the turbine, a governor driven at the speed difference between the turbine and propeller shaft, a governor driven by the propeller shaft, electric switches controlled by said governors, a clutch intermediate said propeller shaft and said turbine, means controlled by the first named governor switch for shifting said clutch, means controlled by the second named governor switch for throttling said engine and means controlled by the third named governor switch for regulating the operation of the first and second named governor switches.

9. In a motor vehicle embodying an engine, a torque converter driven thereby, including a pump and turbine, a gear train associated with said turbine and a propeller shaft, mechanism for the automatic connection of said propeller shaft with said turbine under low torque loads and with said gear train under high torque loads, comprising a pair of differential gear units coupled respectively with said pump and turbine and with said propeller shaft and turbine, a governor driven by each of said differential gear units, a governor driven by said propeller shaft, electric switches controlled by each of said governors, a clutch intermediate said propeller shaft and said turbine, fluid actuated mechanism for shifting said clutch into and out of engagement with said gear train, means regulated by the turbine-propeller shaft governor switch for controlling the operation of said fluid actuated mechanism, means regulated by the pump-turbine governor switch for throttling said engine and means regulated by said propeller shaft governor switch for controlling the operation of the clutch shifting switch and the throttle operating switch.

10. In a motor vehicle embodying an engine, a hydraulic transmission including a pump and a turbine, a gear train associated with the turbine and a propeller shaft, mechanism for the automatic operation of change speed gears in said gear train comprising a clutch, a power operated actuating mechanism therefor, a governor operated at a speed which is a function of the speed of said turbine and said propeller shaft, an electric switch actuated by said governor, means to effect the operation of said switch at a predetermined rate of speed of the governor, means controlled by said switch for operating said clutch actuating mechanism, a governor operated at a speed which is a function of the speed of said pump and said turbine, an electric switch actuated by said governor, means to effect the operation of said switch at a predetermined rate of speed of the governor, means controlled by said switch for throttling said engine, and means controlled by the speed of said propeller shaft for effecting the simultaneous operation of the aforesaid switches.

11. In a motor vehicle embodying an engine, including a crankshaft, a turbine, a gear train coupled with the turbine, and a propeller shaft, mechanism for coupling the propeller shaft with the turbine comprising, a clutch intermediate the turbine and propeller shaft, fluid operated mechanism for shifting said clutch, a differential gear unit driven by the propeller shaft and turbine, an electric switch device for the control of said clutch shifting mechanism actuated by said differential gear unit, a second differential gear unit driven by the engine and turbine, an electric switch device operated by the second differential gear unit for the control of said clutch shifting mechanism, and an overrunning clutch intermediate the crankshaft and turbine for maintaining a uni-directional rotation of the second named differential gear unit.

12. In a motor vehicle embodying an engine, a pump, and a turbine, a gear train coupled with said turbine, a propeller shaft, a clutch intermediate the turbine and propeller shaft and an actuating device for shifting said clutch, mechanism for the control of said actuating device comprising a governor driven at the differential speed of the engine and turbine, an electric switch actuated thereby and adapted to control the operation of said clutch actuating device, and an overrunning clutch intermediate the engine and turbine to maintain a uni-directional movement of said governor.

13. A power transmission mechanism for a motor vehicle including an engine crankshaft and a propeller shaft, said transmission comprising a torque converter including a driving member and a driven member, a shaft for the driven member coaxial with the crankshaft, an overrunning clutch intermediate the crankshaft and the driven member shaft, a gear train, including an overrunning clutch, driven by the driven member shaft and coupled with the propeller shaft, a clutch intermediate the driven member shaft and the propeller shaft, and an electrically controlled automatic shifting mechanism for the last-named clutch operable by the speed difference between the driven member and the propeller shaft.

RENKE BRUNKEN.

REFERENCES CITED

The following references are of record in the file of this patent:

UNITED STATES PATENTS

| Number | Name | Date |
|---|---|---|
| 2,298,648 | Russell | Oct. 13, 1942 |
| 2,333,680 | Schneider et al. | Nov. 9, 1943 |
| 2,333,681 | Schneider et al. | Nov. 9, 1943 |
| 2,343,304 | La Brie | Mar. 7, 1944 |
| 2,373,453 | Brunken | Apr. 10, 1945 |